(12) United States Patent
Kim et al.

(10) Patent No.: US 10,804,580 B2
(45) Date of Patent: Oct. 13, 2020

(54) CELL ASSEMBLY HAVING CUSHION MEMBER

(71) Applicant: LG CHEM, LTD., Seoul (KR)

(72) Inventors: Soo-Youl Kim, Daejeon (KR); Sei-Woon Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 158 days.

(21) Appl. No.: 15/760,301

(22) PCT Filed: Mar. 3, 2017

(86) PCT No.: PCT/KR2017/002333
§ 371 (c)(1),
(2) Date: Mar. 15, 2018

(87) PCT Pub. No.: WO2017/150939
PCT Pub. Date: Sep. 8, 2017

(65) Prior Publication Data
US 2018/0254535 A1   Sep. 6, 2018

(30) Foreign Application Priority Data
Mar. 3, 2016 (KR) .................. 10-2016-0025759

(51) Int. Cl.
*H01M 10/00* (2006.01)
*H01M 10/655* (2014.01)
(Continued)

(52) U.S. Cl.
CPC .......... *H01M 10/655* (2015.04); *C08L 83/04* (2013.01); *H01M 2/10* (2013.01); *H01M 2/1077* (2013.01);
(Continued)

(58) Field of Classification Search
CPC ............. H01M 10/613; H01M 2/1077; H01M 2/1061; H01M 10/625; H01M 10/647; C08L 83/04
See application file for complete search history.

(56) References Cited

U.S. PATENT DOCUMENTS 8,465,864 B1   6/2013   Kwak et al.
8,518,574 B1   8/2013   Kwak et al.
(Continued)

FOREIGN PATENT DOCUMENTS

EP   2031672 A1   3/2009
JP   11-297348 A   10/1999
(Continued)

OTHER PUBLICATIONS

Kuo, Alex C. M. "Poly(Dimethylsiloxane)." Polymer Data Handbook, 2nd ed., Oxford University Press, 2009, pp. 411-435, www.rubloffgroup.umd.edu/teaching/enma490fall03/resources/current/publications_etc/pdh-735(pdms).pdf. (Year: 2010).*
(Continued)

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

The present disclosure discloses a cell assembly including: a plurality of cells arranged at predetermined intervals; and a cushion pad disposed between the cells to be in surface contact with the cells and configured to absorb volumetric expansion of the cells, wherein the cushion pad has a thermal conductivity of 1.5 W/mK or higher.

7 Claims, 2 Drawing Sheets

(51) Int. Cl.
*C08L 83/04* (2006.01)
*H01M 10/613* (2014.01)
*H01M 10/6555* (2014.01)
*H01M 2/10* (2006.01)
*H01M 10/647* (2014.01)
*H01M 10/625* (2014.01)

(52) U.S. Cl.
CPC ....... *H01M 10/613* (2015.04); *H01M 10/647* (2015.04); *H01M 10/6555* (2015.04); *H01M 2/1061* (2013.01); *H01M 10/625* (2015.04)

(56) References Cited

U.S. PATENT DOCUMENTS

| | | | |
|---|---|---|---|
| 9,484,592 B2 | 11/2016 | Roh et al. | |
| 2011/0117410 A1* | 5/2011 | Yoon | H01M 10/6555 429/120 |
| 2013/0202939 A1* | 8/2013 | Kwak | H01M 2/1077 429/120 |
| 2014/0045028 A1 | 2/2014 | Moon et al. | |
| 2014/0113171 A1 | 4/2014 | Schaefer | |

FOREIGN PATENT DOCUMENTS

| | | |
|---|---|---|
| JP | 2012-129282 A | 7/2012 |
| JP | 2012-204129 A | 10/2012 |
| JP | 2013-231166 A | 11/2013 |
| JP | 2014-49424 A | 3/2014 |
| KR | 10-1305122 B1 | 9/2013 |
| KR | 10-2014-0027955 A | 3/2014 |
| KR | 10-1392799 B1 | 5/2014 |
| KR | 10-2015-0055255 A | 5/2015 |
| KR | 10-2015-0114862 A | 10/2015 |
| WO | WO-2015095271 A1 * | 6/2015 |

OTHER PUBLICATIONS

Hamdani, Siska, et al. "Flame Retardancy of Silicone-Based Materials." Polymer Degradation and Stability, vol. 94, No. 4, 2009, pp. 465-495., doi:10.1016/j.polymdegradstab.2008.11.019. (Year: 2009).*
English translation of Written Opinion of the International Searching Authority and International Search Report for Appl. No. PCT/KR2017/002333 dated Jun. 26, 2017.

* cited by examiner

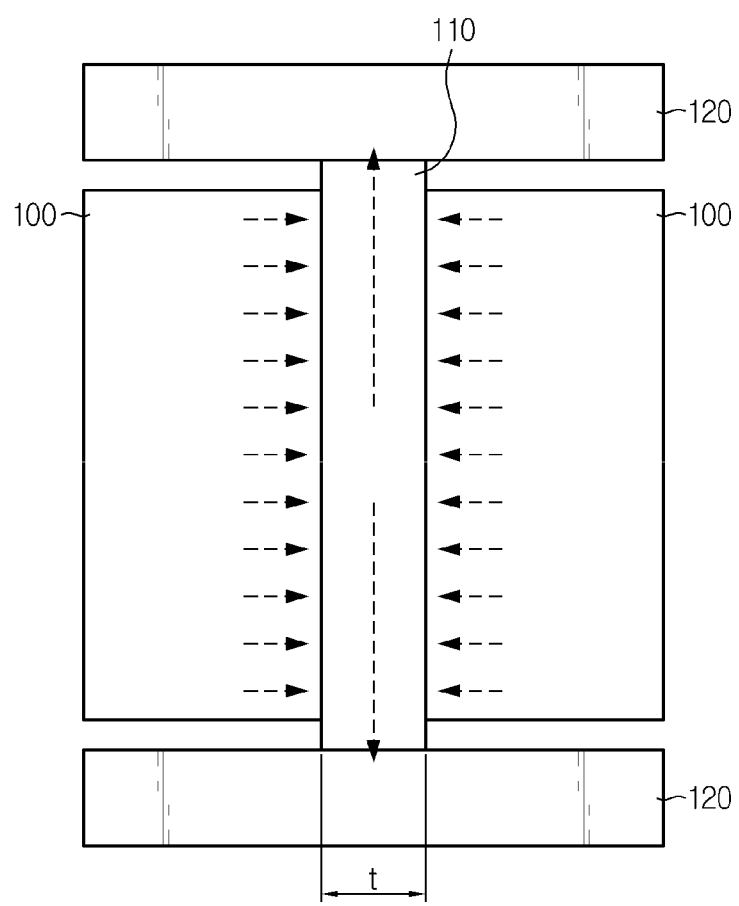

CELL ASSEMBLY HAVING CUSHION MEMBER

TECHNICAL FIELD

The present application claims priority to Korean Patent Application No. 10-2016-0025759 filed on Mar. 3, 2016 in the Republic of Korea, the disclosure of which is incorporated herein by reference.

The present disclosure relates to a cell assembly, and more particularly, to a cell assembly having a cushion member with an improved structure for absorbing volumetric expansion of cells.

BACKGROUND ART

A lithium secondary battery is manufactured by combining a plurality of unit cells into one pack and is widely used in applications requiring high energy such as a vehicle battery or an electric power storage device.

However, when a cell assembly including a plurality of unit cells is overcharged, along with generation of heat, deformation such as swelling and expansion in an outward direction of the module may occur.

In order to absorb, for example, the volumetric expansion of cells as described above, a cushion pad having a predetermined shape and capable of performing a cushioning function is mounted between cells. The cushion pad according to the conventional art as described above has a problem in that circulation or discharge of heat through the pad is difficult. Thus, typically, a component having a heat dissipation function is additionally included inside a pack.

However, when a component for heat dissipation and a component for cushioning as described above are respectively installed, these components occupy a large space inside a battery pack with a limited size, which is very inefficient.

As an alternative, Korean Patent Publication No. 2014-0027955 discloses an energy storage device in which damping devices are mounted on a flat surface of cells as an elastic member (cushion), wherein the damping devices have a good thermal conductivity.

However, in regard to providing an impact absorbing member mounted on a cell, with thermal conductivity, according to the conventional art, no specific configuration allowing efficient heat transfer has been suggested, and thus, a measure for addressing this issue is required.

DISCLOSURE

Technical Problem

The present disclosure is designed to solve the problems of the related art, and therefore the present disclosure is directed to providing a cell assembly in which a single component is provided for both heat circulation and dissipation and cushioning to thereby increase internal space efficiency.

The present disclosure is also directed to providing a cell assembly including a cushion pad with improved structure and properties, in which the cushion pad is interposed between cells so as to provide a cushioning function and a highly efficient heat transfer function.

Technical Solution

In one aspect of the present disclosure, there is provided a cell assembly including: a plurality of cells arranged at predetermined intervals; and a cushion pad disposed between the cells to make a surface contact with the cells and configured to absorb volumetric expansion of the cells, wherein the cushion pad has a thermal conductivity of 1.5 W/mK or higher.

The cushion pad may be formed of a plate-shaped body having at least an area equal to or greater than an area of a planar portion of the cells, wherein a flat portion of the cushion pad is in surface contact with the planar portion of the cell.

An area of a planar portion of the cushion pad may be less than 105% of the area of the planar portion of the cells.

Both end surfaces of the cushion pad may be in contact with an outer frame of the cells.

A thickness of the cushion pad may be 120% to 250% of a volumetric expansion ratio of the cells.

A thermal conductivity of the cushion pad may be 1.5 W/mK to 1.6 W/mK.

The cushion pad may be formed of polydimethylsiloxane.

The cushion pad may be formed of a material that is both an incombustible (fire retardant) material of UL94 V-1 or higher and an insulating material of 10 kV/mm or higher, and has a compression force deflection (CFD) of 20 kPa to 100 kPa in a section with 20% to 60% of strain.

Advantageous Effects

According to the present disclosure, a cushion pad is provided with a high thermal conductivity that allows circulation and dissipation of heat of cells, so as to efficiently use an inner space of a cell assembly.

In addition, as planar portions of the cushion pad and the cells are in surface contact to substantially correspond to each other, volumetric expansion of the cells may be effectively absorbed and thermal conductivity may be optimized to thereby provide a highly efficient heat transfer function.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 2 is an assembled front view of FIG. 1.

MODE FOR DISCLOSURE

Figure 1:
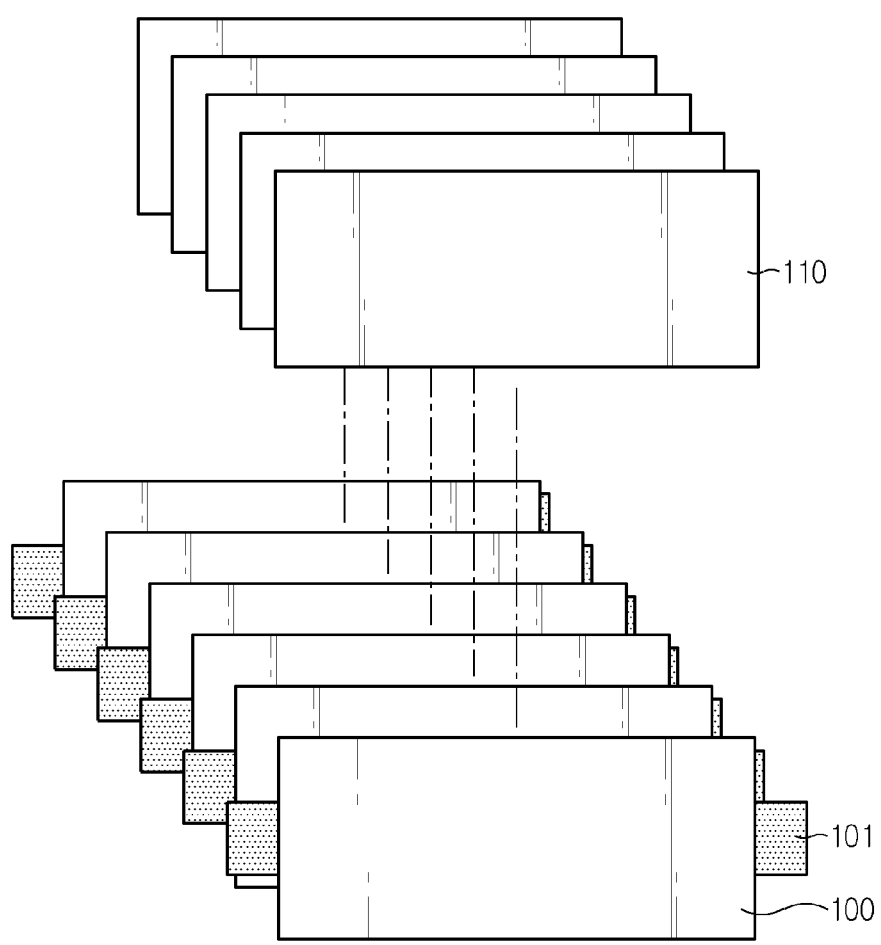
FIG. 1 is a disassembled perspective view of major elements of a cell assembly according to a preferred embodiment of the present disclosure.

FIG. 1 is a disassembled perspective view of major elements of a cell assembly according to a preferred embodiment of the present disclosure, and FIG. 2 is a combined front view of FIG. 1.

Referring to FIGS. 1 and 2, the cell assembly according to the preferred embodiment of the present disclosure includes a plurality of cells 100 and a cushion pad 110 interposed between the cells 100 and providing both a cushioning function and a heat transfer function by using a single component.

A battery having an overall rectangular shape and a thin plate-shaped body, for example, a pouch-type secondary battery, is used as each of the cells 100 for forming the cell assembly. An electrode lead 101 is formed to protrude from both ends of the cells 100 in a length direction. Preferably, the plurality of cells 100 are arranged in one direction so as to substantially form a stack structure.

The cushion pad 110 is interposed between every two of the cells 100, and disposed to be in surface contact with the cells 100. The cushion pad 110 is formed of a plate-shaped body having at least an area equal to or greater than an area of a planar portion of the cells 100, and a planar portion of the cushion pad 110 is in surface contact with the planar portion of the cells 100. The cushion pad 110 may preferably be formed of a foam material having elasticity so as to absorb impact applied, due to, for example, volumetric expansion of the cells 100. In detail, the planar portion of each cushion pad 110 is identical to a length of the cells 100 in a length direction of the planar portion of each cell 100, but is greater than the planar portion of the cells 100 in height, so that an area of the cushion pad 110 may preferably be greater than an area of the planar portion of the cell 100 in a range less than 105%. According to this configuration, even if volumetric expansion is caused in the cells 100, impact may be absorbed while maintaining a sufficiently stable surface contact, and at the same time, high-temperature heat may be efficiently transferred to an outer frame 120. If an area of the planar portion of the cushion pad 110 is 105% or more than that of the planar portion of the cells 100, a too large gap is created between an end edge of the cells 100 and the outer frame 120, which is disadvantageous in terms of space utilization, and the cushion pad 110 is prevented from maintaining a sufficient rigidity in an optimal thickness range of the cells 100 which will be described later.

Both end surfaces of the cushion pad 110 in a thickness direction are in contact with the outer frame 120 having a predetermined shape and supporting the cells 100. According to this configuration, heat generated in the cells 100 is rapidly conducted through the planar portion of the cushion pad 110 which is in surface contact with the cells 100, and then may be discharged to the outer frame 120 through both end surfaces of the cushion pad 110 at the edge thereof.

A thickness (t) of the cushion pad 110 may preferably have a ratio of 120% to 250% of a volumetric expansion rate of the cells 100. If a ratio regarding the thickness (t) is less than 120%, both end surfaces of the cushion pad 110 in a width direction and the outer frame 120 may not be sufficiently bonded, and furthermore, a speed of transferring heat to the outer frame 120 is low, and absorption performance (of the cushion pad 110?) of absorbing impact applied due to, for example, volumetric expansion of the cells 100 may be poor. If a ratio regarding the thickness (t) is over 250%, occupation space of the cushion pad 110 may be too large, which is disadvantageous in terms of space utilization, and a cushioning operation may not be uniformly performed over the two planar portions of the cushion pad 110 in an optimal area range of the cushion pad 110. Considering these characteristics, the thickness (t) of the cushion pad 110 may preferably be designed to be 1.5 mm to 2.0 mm.

The cushion pad 110 has a physical property of a thermal conductivity of 1.5 W/mK or higher. If a thermal conductivity of the cushion pad 110 is less than 1.5 W/mK, a large amount of heat is accumulated in the cushion pad 110 which is in surface contact with the cell 100 to sharply degrade performance of the cells 100. Considering the optimum ratios of the area and the thickness (t) of the cushion pad 110 described above, a thermal conductivity of the cushion pad 110 may preferably satisfy a range from 1.5 W/mK to 1.6 W/mK. The cushion pad 110 may preferably be formed of poly dimethylsiloxane.

In addition, in light of the usage environment where the cushion pad 110 is interposed between the cells 100 and high-temperature heat is applied to two surfaces of the cushion pad 110, the cushion pad 110 may preferably be formed of a material which is both an incombustible (fire retardant) material of UL94 V-1 or higher and an insulating material of 10 kV/mm or higher, and may preferably have a compression force deflection (CFD) of 20 kPa to 100 kPa in a section with 20% to 60% of strain.

According to the cell assembly of the preferred embodiment of the present disclosure having the above-described configuration, by using the cushion pad 110 which maintains an overall surface contact state with the entire planar portion of the cells 100, both a function of absorbing volumetric expansion occurring in the cells 100 and a function of transferring heat generated in the cells 100 to the outside may be both performed.

As described above, according to the cell assembly of the present disclosure, when the cells 100 swell and heat is generated in the cells 100 due to, for example, overcharging, impact may be effectively reduced through surface contact between the cushion pad 110 interposed between the cells 100 and the cells 100, and a plate-shaped structure of the cushion pad 110 having an area equal to or greater than an area of the planar portion of the cells 100 allows heat generated in the cells 100 to be rapidly transferred to the cushion pad 110 and then circulated and discharged through the outer frame 120.

INDUSTRIAL APPLICABILITY

According to the present disclosure, properties of the cushion pad, such as a thermal conductivity, insulating properties, incombustibility or the like, may be optimized so that heat generated in the cells is securely circulated to the outside without causing damage to the cushion pad.

What is claimed is:

1. A cell assembly comprising:
an upper outer frame and a lower outer frame spaced from the upper outer frame in a first direction;
a plurality of cells arranged between the upper outer frame and lower outer frame at predetermined intervals; and
cushion pad disposed between two of the plurality of cells to make a surface contact with the cells and configured to absorb volumetric expansion of the cells,
wherein a top edge of the cushion pad is in continuous contact with the upper outer frame and a bottom edge of the cushion pad is in continuous contact with the lower outer frame, the top edge of the cushion pad and the bottom edge the cushion pad being spaced from each other in the first direction,
wherein the cushion pad has a thermal conductivity of 1.5 W/mK or higher, and
wherein the cushion pad is made of foam material.

2. The cell assembly of claim 1, wherein the cushion pad is formed of a plate-shaped body having at least an area equal to or greater than an area of a planar portion of the cells, and
wherein a flat portion of the cushion pad is in surface contact with the planar portion of the cell.

3. The cell assembly of claim 1, wherein an area of a planar portion of the cushion pad is less than 105% of the area of the planar portion of the cells.

4. The cell assembly of claim 1, wherein a thickness of the cushion pad is 120% to 250% of a volumetric expansion ratio of the cells.

5. The cell assembly of claim 4, wherein a thermal conductivity of the cushion pad is 1.5 W/mK to 1.6 W/mK.

6. The cell assembly of claim 1, wherein the cushion pad is formed of polydimethylsiloxane.

7. The cell assembly of claim 1, wherein the cushion pad is formed of a material that is both an incombustible (fire retardant) material of UL94 V-1 or higher and an insulating material of 10 kV/mm or higher, and has a compression force deflection (CFD) of 20 kPa to 100 kPa in a section with 20% to 60% of strain.

* * * * *